JOHN B. SMITH.
Improvement in Direct Acting Engines.

No. 124,862.                          Patented March 19, 1872.

Witnesses
D. P. Cowl
Edmund Masson

Inventor:
John B. Smith,
By atty A. B. Stoughton.

124,862

UNITED STATES PATENT OFFICE.

JOHN B. SMITH, OF DUNMORE, PENNSYLVANIA.

IMPROVEMENT IN DIRECT-ACTING STEAM-ENGINES.

Specification forming part of Letters Patent No. 124,862, dated March 19, 1872.

*To all whom it may concern:*

Be it known that I, JOHN B. SMITH, of Dunmore, in the county of Luzerne and State of Pennsylvania, have invented certain new and useful Improvements in Direct-Acting Steam-Engines for Pumping and other purposes; and I do hereby declare the following to be a full, clear, and exact description of the same, reference being had to the accompanying drawing making a part of this specification, in which—

Figure 1:
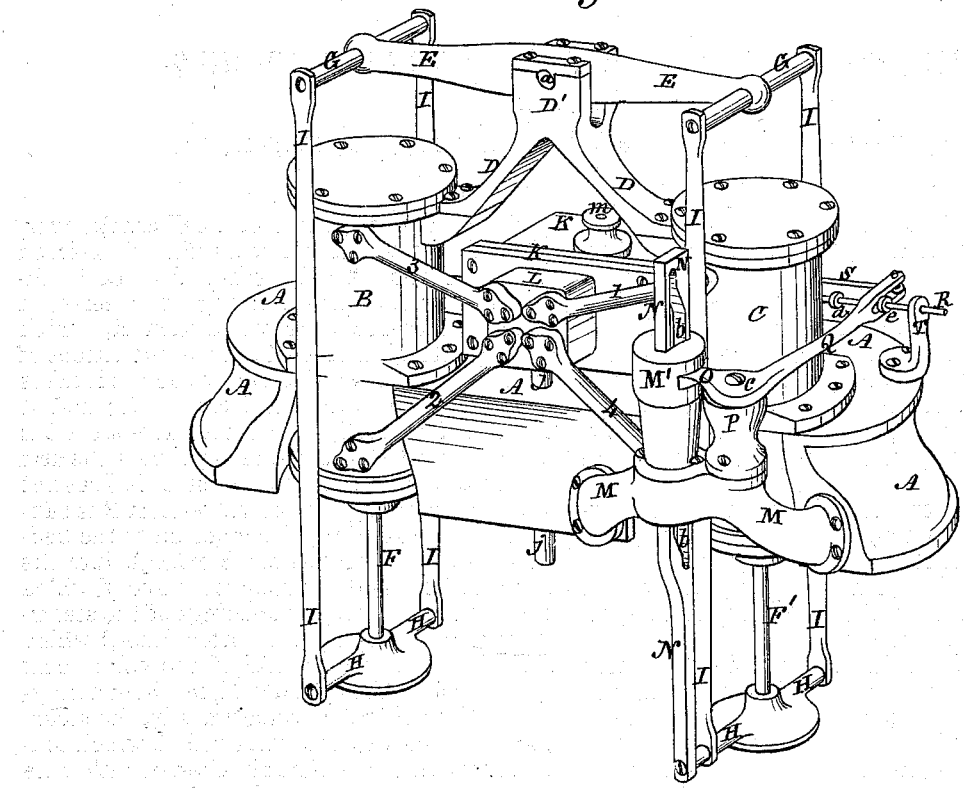
Figure 2:
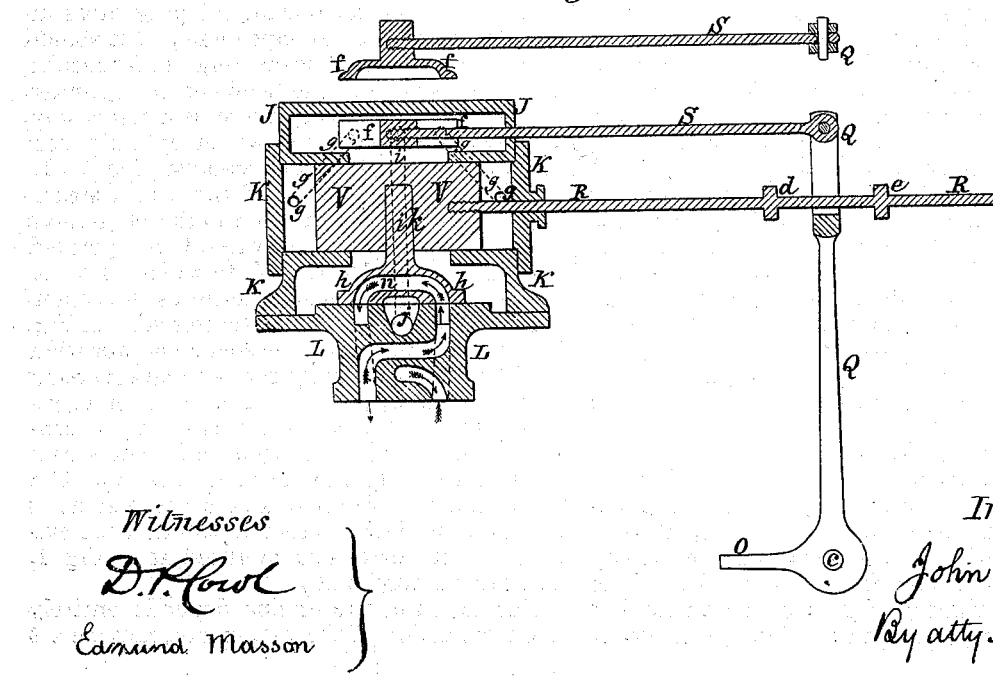

Figure 1 represents a perspective of the exterior of the steam-engine, and showing its general construction and arrangement. Fig. 2 represents a horizontal section of the valves and valve-chests, and showing the steam-passages connected therewith.

This invention relates to certain appliances by which steam is admitted, controlled, and directed so as to operate two pistons working in separate cylinders, which pistons, through their rods, cross-heads, and connecting-rods, are attached to the opposite ends of a walking-beam, as will be explained.

To enable others skilled in the art to make and use my invention, I will proceed to describe the same with reference to the drawing.

A represents the bed or base of the engine, upon which the two upright steam-cylinders, B and C, are attached and supported. From near the tops of the cylinders B C extend two arms, D, which unite at D' and form a support for the journals, bearings, or trunnions $a$ of a walking-beam, E. The piston-rods F F' enter and work through the lower ends of the steam-cylinders B C, respectively, and on the outer ends of these piston-rods there is a cross-head, H, which is connected to a cross-head, G, on the end of the walking-beam E through connecting-rods I I outside of and at opposite sides of the cylinders B C. On the bed or frame A is also placed and supported the steam and valve-chest, which may be said to be composed of three parts or divisions, J K L, which are, however, connected by steam-ways or passages, as will be explained hereafter. Upon the bed or frame is also placed a bracket, M, for supporting in or on a pillar, M', first, an arm, N, which is attached to and moves up and down with one of the cross-heads, H, as seen to the right of Fig. 1; said arm having in its upper portion a cam-slot, $b$, into which projects the short arm O of a bell-crank lever, pivoted to the bracket or a pillar, P, thereon at the point $c$. The long arm Q of said bell-crank lever extends far enough to receive, in a slot cut thereon, the valve-stem R, which has tappets $d$ $e$ thereon to define the extent of motion that the arm Q may have before it takes and carries the valve-stem R with it; and at the end of said long arm Q the valve-stem S is connected, so as to move always when the arm moves, which the other valve-stem R does not do. The outer end of the valve-stem R is supported in a standard, T, connected to the bed-frame A. The valve-stem S extends into the valve-chest J, and has upon it a valve, $f$, which closes and discloses the openings of the steam-ways or passages $g$ $g$, (in dotted lines,) which extend one from each end of the valve-chest to each end of the cylinder K, in which a plug-valve, V, is operated, sometimes by the steam and sometimes by the valve-rod R, which connects it with the bell-crank lever, or rather its arm Q, and through which and the tappets $d$ $e$ on said valve-stem R, it is at times moved. The openings of the steam-passages $g$ $g$ in the cylinder K are at a short distance from the heads of said cylinder, as seen in Fig. 2, so as to form a steam-cushion for the plug-valve after it passes the steam-openings $g$, if it should ever so pass beyond said openings, or far enough to otherwise strike the heads of the cylinder. Underneath the valve $f$ there is a steam-way, $i$, shown in dotted lines, which extends from the valve-chest J to the exhaust-pipe $j$. In the steam or valve chest K there is a steam-valve, $h$, which is connected to the plug-valve V by a stem, $k$. This valve $h$ is operated through the plug-valve V, to which it is attached, and it closes and discloses the steam-ways or passages 1, 2, 3, 4, (better seen in Fig. 1,) which extend from the steam-chest or what might be appropriately termed the reversing steam or valve chest L and K to the ends, respectively, of the two cylinders B C, to convey steam to and carry off the dead steam from said cylinders to the exhaust-pipe $j$. The steam that is admitted and controlled as it passes from the inlet to and through the cylinders to the exit is so admitted at $m$, Fig. 1, and the exhaust is at $j$.

The action of the engine depends entirely upon the action of the valves, and may be set forth as follows: The cam-slot b in the upper end of the bar N moves the bell-crank lever O Q from point to point, according to the "throw" of said cam-slot, and the valve f, which is connected to said lever through its stem S, is also moved thereby. Steam is admitted to the plug-valve V from the valve f through the passages g g leading from the valve f to the cylinder K. The passages g enter the plug-cylinder K a short distance from the heads of said cylinder, so as to make said valve cushion itself after it has traveled the length of its stroke. The main valve h can never make a full stroke without getting steam from the valve f, and just before steam is admitted through valve f the bell-crank lever moves said valve f and exhausts steam from one end of cylinder K, and then comes in contact with one or the other of the tappets d e and moves the plug V out of its cushioning-place, and admits steam into the said plug-cylinder from the valve f. In case the steam does not act upon the plug V soon enough to reverse, the bell-crank lever O Q will continue to move the valve h, cuts off the supply of steam from the main cylinders, admits a jet of steam from the steam-end of the cylinders through the passage n, as shown by the arrows, Fig. 2, into the exhaust-end of said cylinders, closes it in there, and forms a cushion for the main pistons. Thus there is no danger of the engine going to pieces, for the steam that puts it in motion has double the power to stop it that it has to keep it in motion after the pistons have reached the end of their stroke. If the end Q of the bell-crank lever be at either of the tappets d e, and steam be admitted through the nozzle m, the valve f, which is at one end of its stroke, will let steam into one end of the plug-cylinder K, and will exhaust from the other end; and when the valve h has been moved to one end of its stroke steam will be admitted to the main cylinders B C. If admitted to the top of the cylinder B it will at the same time be admitted to the bottom of the cylinder C through or by means of the pipes 3 4, Fig. 1, leading to the right-hand ports on the face of the reversing-box L, and at the same time exhaust from the top of the cylinder C and the bottom of the cylinder B through the pipes 1 2 leading to the left-hand ports on the face of the reversing-box L. When the pistons in the main cylinders reach either the top or bottom of their stroke the cam-slot b in the bar N will move the bell-crank lever and give motion to the valve f, and steam will again act on the plug-valve V, as before described.

What I claim is—

1. In combination with a cross-head moving with the piston of a steam-engine, the cam-slotted bar N, bell-crank lever O Q, and valve-stems S R for controlling and operating the valves f and V, as and for the purpose described.

2. I also claim the combination of the valve h, reversing-box L and its steam-ports, steam-pipes 1, 2, 3, 4, united therewith and connected to the tops and bottoms of the main cylinders B C, respectively, as and for the purpose described and represented.

JOHN B. SMITH.

Witnesses:
ANTHONY HORAN,
GEO. B. SMITH.